Patented Oct. 29, 1940

2,219,899

UNITED STATES PATENT OFFICE 2,219,899

BINDER FOR MAKING LUMINESCENT SCREENS

Henry Grainger Jenkins, Pinner, England, assignor to General Electric Company, a corporation of New York No Drawing. Application April 6, 1938, Serial No. 200,556. In Great Britain April 8, 1937

5 Claims. (Cl. 250—80)

This invention relates to binders for making luminescent screens, that is to say, for coating surfaces of vitreous material, with a thin layer of material adapted to be excited to luminescence by aetherial radiation, cathode rays, or contact with an electric discharge.

In the usual process for making luminescent screens, the surface is first coated with a thin film of a liquid binder, powdered luminescent material is dusted or sprayed upon this film, and the resulting product is heated to disperse or consolidate the binder.

The binders used for this purpose are usually much more viscous than water; among them are glycerine (which may contain additions, especially boric acid), water-glass (i. e. a solution of potassium or sodium silicate), and phosphoric or analogous acids in a solvent such as acetone; many other materials have been proposed, but I have no extensive experience of their use. Of these three glycerine is apt to char slightly when it is dispersed and to leave behind highly adsorbent matter (probably carbon) which impairs the efficiency of the screen. Phosphoric or analogous acids, when they are consolidated, attack the glass; this is of no consequence when the glass is comparatively thick, for example the wall of a discharge tube; but if the glass is thin, for example the wall of a bulb, such as is used for electric incandescent lamps, enclosing a high-pressure mercury-vapour lamp, the attack makes the glass extremely fragile. The reason may be the same as that which requires the practice of double-etching in the internal frosting of such bulbs. Moreover these acids attack some luminescent materials. Water glass also weakens the thin glass of a bulb very greatly; but it is not known whether the reason is the same.

The primary object of the invention is to provide a binder, suited for coating thin bulbs, which is relatively free from all these disadvantages. It is also desirable that it should have a property not possessed fully by any of the three materials mentioned, namely that the residue left by its dispersal or consolidation should be easily soluble in water so as to release the luminescent material. For luminescent materials are expensive and the few grams usually associated with a lamp or cathode ray tube may cost an appreciable fraction of its value. It is therefore desirable that if for any reason the device fails, especially before use, the luminescent material should be recoverable.

I have found that non-viscous solutions, which may be aqueous of certain stable inorganic salts of the alkali metals provide binders having in a large degree the desired properties. By "stable" I mean that in the consolidation stage of the process, the salts undergo no chemical change either by way of decomposition or by way of reaction with the glass or luminescent material. By a non-viscous solution I mean one which is not substantially more viscous than water. The remarkable discovery on which the invention rests is that a satisfactory binder can be found which is neither viscous, nor suffers any change other than loss of solvent. However it must be observed that these binders have not fully one of the desired properties, for they are liable to attack luminescent sulphides.

According to the invention in the manufacture of luminescent screens (other than those in which a sulphide is the main luminescent material) by the aforesaid usual process the temperature attained in the third or heating step of the said process does not exceed 500° C. and the binder consists substantially of a non-viscous solution of one or more inorganic salts of the alkali metals, which salts are such that they undergo no chemical change when heated in the third step of the said process.

Many such salts have been examined; those that have proved most satisfactory are sodium or potassium carbonate or sulphate. The solution should preferably contain about 10% of the carbonate or 5% of the sulphate, the solvent being water.

One embodiment of the invention will now be described by way of example. A thoroughly clean bulb, such as is used for 1500 watt electric incandescent lamps, is partially filled with a 10% aqueous solution of sodium carbonate

$(Na_2CO_3.10H_2O)$

The bulb is shaken so that the sides are completely wetted; it is then drained open end downwards for about 4 minutes and then stood open end upwards for about 1 minute. The luminescent powder (for example, a silicate or tungstate) is sprayed on the residual film with a powder spray; the bulb is then heated in air at about 350° C. for a period of 5 minutes.

I claim:

1. The method of manufacturing a luminescent screen other than one in which a sulphide is the main luminescent material which comprises attaching the luminescent material to a support member by means of a binder consisting of a non-viscous solution of an inorganic salt of the class consisting of the carbonates and sulphates of alkali metals, and then heating to a temperature not exceeding 500° C.

2. The method of manufacturing a luminescent screen other than one in which a sulphide is the main luminescent material which comprises coating the surface of a support member with a thin film of a binder consisting of a non-viscous solution of an inorganic salt of the class consisting of the carbonates and sulphates of alkali metals, dusting the powdered luminescent material upon the said film, and then heating to a temperature not exceeding 500° C.

3. The method of manufacturing a luminescent screen other than one in which a sulphide is the main luminescent material which comprises coating the surface of a support member with a thin film of a binder consisting of a non-viscous solution of an inorganic salt of the class consisting of the carbonates and sulphates of sodium and potassium, dusting the powdered luminescent material upon the said film, and then heating to a temperature not exceeding 500° C.

4. A luminescent screen other than one in which a sulphide is the main luminescent material comprising a support member coated with a binder consisting of an inorganic salt of the class consisting of the carbonates and sulphates of alkali metals, and powdered luminescent material adherent to said binder.

5. A luminescent screen other than one in which a sulphide is the main luminescent material comprising a support member coated with a binder consisting of an inorganic salt of the class consisting of the carbonates and sulphates of sodium and potassium, and powdered luminescent material adherent to said binder.

HENRY GRAINGER JENKINS.